United States Patent
Jo et al.

(10) Patent No.: US 10,823,892 B2
(45) Date of Patent: Nov. 3, 2020

(54) DEVICE FOR TESTING OPTICAL PROPERTIES AND METHOD FOR TESTING OPTICAL PROPERTIES

(71) Applicant: LG CHEM, LTD., Seoul (KR)

(72) Inventors: Min Yeong Jo, Daejeon (KR); Jin Yong Park, Daejeon (KR); Dong Min Park, Daejeon (KR); Won Chul Lee, Daejeon (KR); Ki Jun Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 82 days.

(21) Appl. No.: 16/329,976

(22) PCT Filed: Aug. 29, 2017

(86) PCT No.: PCT/KR2017/009414
§ 371 (c)(1),
(2) Date: Mar. 1, 2019

(87) PCT Pub. No.: WO2018/044030
PCT Pub. Date: Mar. 8, 2018

(65) Prior Publication Data
US 2019/0196081 A1    Jun. 27, 2019

(30) Foreign Application Priority Data
Sep. 2, 2016  (KR) .......................... 10-2016-0112917

(51) Int. Cl.
*G01J 4/00*    (2006.01)
*G02B 5/30*    (2006.01)
*G01M 11/00*   (2006.01)
*G01J 9/00*    (2006.01)
*G01N 21/88*   (2006.01)

(52) U.S. Cl.
CPC .............. *G02B 5/3083* (2013.01); *G01J 9/00* (2013.01); *G01M 11/00* (2013.01); *G01N 21/8806* (2013.01); *G02B 5/30* (2013.01); *G01J 2009/002* (2013.01); *G01N 2021/8848* (2013.01)

(58) Field of Classification Search
CPC ...... G01N 21/23; G01N 21/21; G01N 21/211; G01J 4/00; G01J 4/04
USPC ......................................... 356/365
See application file for complete search history.

(56) References Cited

U.S. PATENT DOCUMENTS

| | | | | |
|---|---|---|---|---|
| 2004/0075797 A1* | 4/2004 | Zhu | ................ | G02F 1/133528 349/117 |
| 2017/0168205 A1* | 6/2017 | Hsieh | ................ | G02B 5/3083 |

FOREIGN PATENT DOCUMENTS

| | | |
|---|---|---|
| CN | 103196658 A | 7/2013 |
| JP | 2009047476 A | 5/2009 |
| JP | 2009097915 A | 7/2009 |
| JP | 2009236678 A | 10/2009 |
| KR | 10-1995-0014106 | 11/1995 |
| KR | 10-2001-0029248 | 4/2001 |

(Continued)

*Primary Examiner* — Md M Rahman
(74) *Attorney, Agent, or Firm* — Dentons US LLP

(57) ABSTRACT

The present application relates to a device for testing optical properties and a method for testing optical properties using the same. The device of the present application has inexpensive manufacturing and maintenance costs, is capable of testing a wide range of plane directional phase differences, and provides the method for testing optical properties with improved identification efficiency of the phase retardation axis.

16 Claims, 1 Drawing Sheet

(56) References Cited

FOREIGN PATENT DOCUMENTS

| | | |
|---|---|---|
| KR | 1020060076177 A | 7/2006 |
| KR | 100640522 B1 | 10/2006 |
| KR | 1020080071820 A | 8/2008 |
| KR | 1020130043546 A | 4/2013 |
| KR | 1020150086633 A | 7/2015 |
| TW | 200622227 | 7/2006 |
| TW | 201534886 | 9/2015 |

\* cited by examiner

[Figure 1]
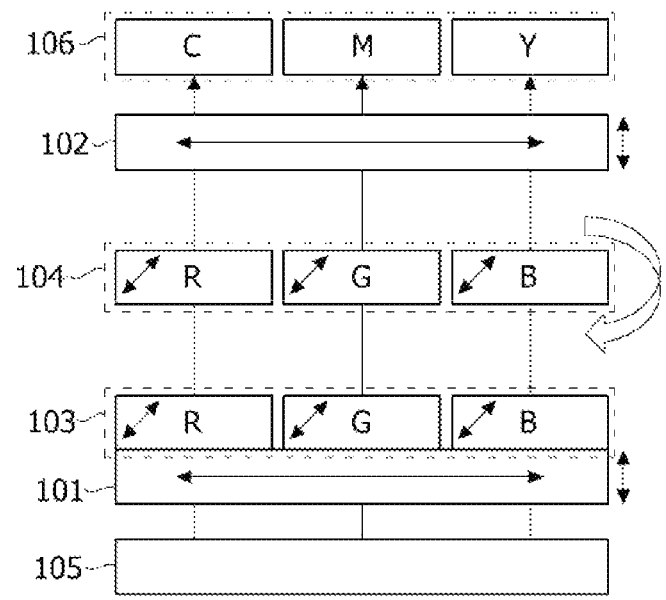
[Figure 2]
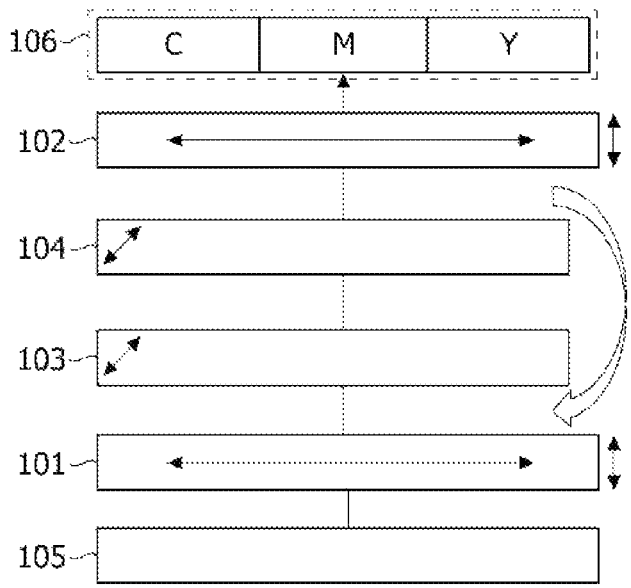

US 10,823,892 B2

DEVICE FOR TESTING OPTICAL PROPERTIES AND METHOD FOR TESTING OPTICAL PROPERTIES

TECHNICAL FIELD

This application is a National Stage Application of International Application No. PCT/KR2017/009414, filed Aug. 29, 2017 which claims priority to and the benefits of Korean Patent Application No. 10-2016-0112917, filed with the Korean Intellectual Property Office on Sep. 2, 2016, the entire contents of which are incorporated herein by reference.

BACKGROUND ART

A quarter-wave film has a function to convert linearly polarized light into circularly polarized light, and thus is highly utilized in patterned 3D implementation, OLED low reflective films, and the like.

Upon testing a phase retardation axis in the quarter-wave film, conventionally, the test was carried out by a method of identifying the phase retardation axis, in which a light source generating polarized light through a polarized light source generating device is transmitted into a sample to be tested and it is tested how much the relevant polarized light changes in a detector.

However, when the polarized light source generating device and the detector for sensing the same are used, there is a problem that expensive device manufacturing and maintenance costs are incurred.

In order to solve this problem, in the case of a polarizing plate to which the quarter-wave film is applied, the optical function is implemented identically when an angle between the absorption axis of the polarizing plate and the phase retardation axis of the quarter-wave film forms 45° or 135°, but there is a problem that it is difficult to provide a device for testing capable of distinguishing the angle formed by the absorption axis of the polarizing plate and the phase retardation axis of the quarter-wave film after commercializing the polarizing plate to which the quarter-wave film is applied. There is a demand for a device for testing optical properties to solve such a problem.

PRIOR ART DOCUMENTS

Patent Documents (Patent Document 0001) Korean Registered Patent Publication No. 10-0640522

DISCLOSURE

Technical Problem

It is an object of the present invention to provide a device for testing optical properties with inexpensive device manufacturing and maintenance costs, and a method for testing optical properties with improved identification efficiency of the phase retardation axis, which is capable of testing a wide range of plane directional phase differences using the device for testing optical properties.

Technical Solution

The present application relates to a device for testing optical properties. The device for testing optical properties may be, for example, a device for testing with inexpensive device manufacturing and maintenance costs, which is capable of testing a wide range of plane directional phase differences and has improved identification efficiency of the phase retardation axis.

An exemplary device for testing optical properties may comprise a light source, a lower polarizer, a first quarter-wave film, a second quarter-wave film, an upper polarizer and a color detecting part in sequence.

The device for testing optical properties of the present application has inexpensive device manufacturing and maintenance costs, and can test a wide range of plane directional phase differences and improve the identification efficiency of the phase retardation axis by emitting non-polarized light from the light source to the lower polarizer side to sequentially transmit the lower polarizer, the first quarter-wave film, the second quarter-wave film and the upper polarizer and then detecting the light to transmit the upper polarizer at the color detecting part.

FIGS. 1 and 2 illustrate embodiments of the device for testing optical properties comprising a lower polarizer (101), an upper polarizer (102), a first quarter-wave film (103), a second quarter-wave film (104), a light source (105) and a color detecting part (106). FIG. 1 illustrates a device for testing optical properties in which the state where the first quarter-wave film (103) is disposed on the lower polarizer (101) is included in, for example, a state where the first quarter-wave film (103) is attached on the lower polarizer (101). This is for measuring a phase retardation axis of the first quarter-wave film (103) by horizontally rotating the second quarter-wave film (104) in a state fixed so that the phase retardation axis of the first quarter-wave film (103) forms 45° or 135° with the absorption axis of the lower polarizer (101). FIG. 2 illustrates a device for testing optical properties in which the state where the first quarter-wave film (103) is disposed on the lower polarizer (101) is included in, for example, a state where the first quarter-wave film (103) is not attached on the lower polarizer (101). This is for measuring plane directional phase differences of the first quarter-wave film (103) and the second quarter-wave film (104) by fixing phase retardation axes of the first quarter-wave film (103) and the second quarter-wave film (104) parallel to each other and rotating the phase retardation axes so that they form 45° or 135° with the absorption axis of the lower polarizer (101) or the upper polarizer (102).

In this specification, the term "polarizer" may mean a functional layer exhibiting an anisotropic transmission property with respect to incident light while having a transmission axis formed in either direction. For example, the polarizer may have a function of transmitting light that oscillates in any one direction from incident light oscillating in various directions, and reflecting or absorbing light oscillating in the other directions to block it. Such a polarizer may be, for example, a reflective polarizer or an absorptive polarizer, and the lower polarizer and the upper polarizer of the present application may be an absorptive polarizer.

In this specification, the term "absorptive polarizer" may mean a layer that transmits light having a direction parallel to the transmission axis from incident light oscillating in various directions and absorbs light oscillating in the other directions to block it. In one example, the absorptive polarizer may have a transmission axis and an absorption axis orthogonal to each other in the plane direction. For example, the angle formed between the transmission axis and the absorption axis may form 85° to 95° or 90°, where light oscillating in a direction parallel to the transmission axis may be transmitted, and light oscillating a direction parallel to the absorption axis may be reflected or absorbed.

In this specification, when defining angles and simultaneously using a term such as vertical, parallel, orthogonal or horizontal, it means substantial vertical, parallel, orthogonal, or horizontal without impairing the desired effect, and for example, comprises an error in consideration of a manufacturing error or variation, and the like. For example, each of the above cases may comprise an error within about ±15°, an error within about ±10°, or an error within about ±5°.

As the absorptive polarizer, a typical absorptive polarizer known in the art can be used. For example, as the absorptive polarizer, a polymer film dyed with an iodine compound or an organic dye and drawn, for example, a polyvinyl alcohol (PVA) film, or the like can be used. Such an absorptive polarizer may usually have a transmission axis and an absorption axis orthogonal to the transmission axis. In addition, on one side or both sides of the polarizer, for example, a protective film for a polarizer known in the art, such as a TAC sheet, may be attached, without being limited thereto.

In this specification, the term "quarter-wave film" may mean a phase retardation film capable of retarding incident light by ¼ times its wavelength. Such a quarter-wave film can serve to make circularly polarized light into linearly polarized light, or to make linearly polarized light into circularly polarized light. In one example, the quarter-wave film may have a plane directional phase difference, with respect to light having a wavelength of 360 nm, of 50 nm to 250 nm or 90 nm to 200 nm or so. In this specification, the term "plane directional phase difference" is a numerical value calculated by "(nx−ny)×d," where nx is a refractive index of the relevant layer in a planar slow axis direction, ny is a refractive index of the relevant layer in a planar fast axis direction, and d is a thickness of the quarter-wave film. Furthermore, in this specification, the term "slow axis" may mean an axis of the direction showing the highest refractive index in a quarter-wave film, and the slow axis herein may be used in the same meaning as the phase retardation axis. In this specification, the term "fast axis" may mean an axis of the direction showing the lowest refractive index in the quarter-wave film, i.e., the direction orthogonal to the slow axis.

In one example, the quarter-wave film may be a polymer film or a liquid crystal film. For example, as the polymer film, a film comprising PC (polycarbonate), a norbornene resin, PVA (poly(vinyl alcohol)), PS (polystyrene), PMMA (poly(methyl methacrylate)), polyolefin such as PP (polypropylene), PAR (poly(arylate)), PA (polyamide), PET (poly(ethylene terephthalate)) or PS (polysulfone), and the like can be used. The polymer film may be subjected to a drawing or shrinkage treatment under appropriate conditions to impart birefringence and may be used as the quarter-wave film.

In another example, the quarter-wave film may be a liquid crystal film formed by orienting and polymerizing a polymerizable liquid crystal compound. The liquid crystal film may comprise a polymerizable liquid crystal compound in a polymerized state. In this specification, the term "polymerizable liquid crystal compound" may mean a compound containing a moiety capable of exhibiting liquid crystallinity, such as a mesogen skeleton, and containing at least one polymerizable functional group. In this specification, the term "it may comprise the polymerizable liquid crystal compound in a polymerized state" may mean a state in which the liquid crystal compound is polymerized to form a skeleton such as a main chain or side chains of the liquid crystal polymer in the liquid crystal film. For example, the polymerizable liquid crystal compound may be contained in the liquid crystal film in a horizontally oriented state. In this specification, the term "horizontal orientation" may mean a case in which the optical axis of the liquid crystal film containing the polymerized liquid crystal compound has a tilt angle of about 0° to about 25°, about 0° to about 15°, about 0° to about 10°, about 0° to about 5° or about 0° with regard to the plane of the liquid crystal film. By using the two quarter-wave films, the device for testing optical properties can test a wide range of plane directional phase differences and identify the phase retardation axis of the first quarter-wave film or the second quarter-wave film, only when the phase retardation axes of the first quarter-wave film and the second quarter-wave film are parallel, so that it can identify the phase retardation axis efficiently.

The light source is a light source that emits un-polarized light oscillating in various directions, where various types of lamps emitting various white lights or having a continuous spectrum in the spectral range of the visible light region can be used. By using un-polarized light as the light source, the manufacturing and maintenance costs of the device for testing optical properties can be inexpensive.

In one example, the light source may emit the un-polarized light to the lower polarizer side. The light source from which the un-polarized light is emitted may be polarized in a direction parallel to the transmission axis of the lower polarizer while transmitting the lower polarizer.

The lower polarizer and the upper polarizer may be disposed such that their absorption axes are parallel to each other. For example, when the lower polarizer has an absorption axis in one direction (shown as ↔), the upper polarizer may also have an absorption axis in one direction (shown as ↔), and the lower polarizer and the upper polarizer may have transmission axes in a direction (shown as ↕) orthogonal to the absorption axes. By having the absorption axes of the lower polarizer and the upper polarizer parallel, the un-polarized light emitted from the light source can be aligned as the light that can transmit the upper polarizer through the lower polarizer.

The plane directional phase difference of the first quarter-wave film or the second quarter-wave film may be 90 nm to 200 nm. For example, when the first quarter-wave film or the second quarter-wave film has a plane directional phase difference of 90 nm, a yellow color, which is a color of the light excluding the wavelength of the light corresponding to four times the plane directional phase difference, can be represented in the color detecting part as described below; when the first quarter-wave film or the second quarter-wave film has a plane directional phase difference of 125 nm, a magenta color, which is a color of the light excluding the wavelength of the light corresponding to four times the plane directional phase difference, can be represented in the color detecting part as described below; and when the first quarter-wave film or the second quarter-wave film has a plane directional phase difference of 200 nm, a cyan color, which is a color of the light excluding the wavelength of the light corresponding to four times the plane directional phase difference, can be represented in the color detecting part as described below.

The plane directional phase difference of the first quarter-wave film or the second quarter-wave film may be equal to each other. For example, when the first quarter-wave film has a plane directional phase difference of 90 nm, the second quarter-wave film may also have a plane directional phase difference of 90 nm; when the first quarter-wave film has a plane directional phase difference of 125 nm, the second quarter-wave film may also have a plane directional phase difference of 125 nm; and when the first quarter-wave film has a plane directional phase difference of 200 nm, the second quarter-wave film may also have a plane directional phase difference of 200 nm.

The plane directional phase difference of the first quarter-wave film or the second quarter-wave film is formed to be equal to each other, so that the color of the light excluding the wavelength of the light corresponding to four times the plane directional phase difference of the first quarter-wave film or the second quarter-wave film can be detected in the color detecting part.

In this specification, the term "color detecting part" may mean a part where a color corresponding to the wavelength of light is detected. For example, the color detecting part may be a part in which the un-polarized light emitted from the light source transmits the lower polarizer, the first quarter-wave film, the second quarter-wave film and the upper polarizer sequentially to detect the color. By detecting the color of the light transmitting the upper polarizer, the optical properties of the quarter-wave film can be tested.

The optical properties can be evaluated when the color of the light excluding the wavelength of the light corresponding to four times the plane directional phase difference of the first quarter-wave film or the second quarter-wave film is detected by the color detecting part. For example, as described above, when a yellow color is detected in the color detecting part in the case that the first quarter-wave film or the second quarter-wave film has a plane directional phase difference of 90 nm, when a magenta color is detected in the color detecting part in the case that the first quarter-wave film or the second quarter-wave film has a plane directional phase difference of 125 nm, and when a cyan color is detected in the color detecting part in the case that the first quarter-wave film or the second quarter-wave film has a plane directional phase difference of 200 nm, the optical properties of the quarter-wave film can be evaluated.

In one example, the optical property to be tested through the device for testing may be a phase retardation axis of the second quarter-wave film.

When the phase retardation axis of the second quarter-wave film is to be tested, the second quarter-wave film may have a plane directional phase difference of a known value.

The first quarter-wave film may have a plane direction phase difference and phase retardation axis of a known value. For example, the plane directional phase difference of the first quarter-wave film may be a value known to be the same value as the plane directional phase difference of the second quarter-wave film, and the phase retardation axis of the first quarter-wave film may have an angle, with the absorption axis of the lower polarizer, of a known value. The phase retardation axis of the second quarter-wave film, and the plane directional phase difference and the phase retardation axis of the first quarter-wave film have known values, so that when the color of the light excluding the wavelength of the light corresponding to four times the first quarter-wave film or the second quarter-wave film is detected in the color detecting part, the phase retardation axis of the second quarter-wave film can be efficiently tested through the phase retardation axis having a known value of the first quarter-wave film.

The phase retardation axis of the second quarter-wave film may be tested by rotating the second quarter-wave film horizontally in a state fixed so that the phase retardation axis of the first quarter-wave film forms 45° or 135° with the absorption axis of the lower polarizer. For example, the first quarter-wave film is fixed in a state disposed on the lower polarizer such that the angle between the phase retardation axis of the first quarter-wave film and the absorption axis of the lower polarizer forms 45° or 135° and the second quarter-wave film is horizontally rotated in a speed of 0.005 m/s to 0.5 m/s such that the color of the light excluding the wavelength of the light corresponding to four times the plane directional phase difference of the first quarter-wave film or the second quarter-wave film is detected in the detecting part, and thus the phase retardation axis of the second quarter-wave film can be efficiently tested.

When the color of the light excluding the wavelength of the light corresponding to four times the plane directional phase difference of the second quarter-wave film is detected in the color detecting part, it can be determined that the phase retardation axis of the second quarter-wave film is parallel to the phase retardation axis of the first quarter-wave film. That is, in the case of testing the phase retardation axis of the second quarter-wave film, it is possible to function as a half-wave film when the phase retardation axes of the first quarter-wave film and the second quarter-wave film are formed in parallel. In this case, while the linearly polarized light transmitting the lower polarizer passes through the first quarter-wave film and the second quarter-wave film, the light of the wavelength corresponding to four times the plane directional phase differences of the first quarter-wave film and the second quarter-wave film cannot transmit the upper polarizer, since the vibration direction of the linearly polarized light is rotated by 90°, and the light having the wavelength region not corresponding to four times the plane directional phase differences of the first quarter-wave film and the second quarter-wave film can transmit the upper polarizer, since the vibration direction of the linearly polarized light is maintained.

In another example, the optical property to be tested through the device for testing may be plane directional phase differences of the first quarter-wave film and the second quarter-wave film each having a phase retardation axis of a known value.

The plane directional phase difference can be tested in a state disposed such that the phase retardation axes of the first quarter-wave film and the second quarter-wave film are fixed parallel to each other and the phase retardation axes form 45° or 135° with the absorption axis of the lower polarizer or the upper polarizer. For example, in a state where the phase retardation axes of the first quarter-wave film and the second quarter-wave film are fixed parallel to each other, the plane directional phase difference can be tested by disposing the films between the lower polarizer and the upper polarizer such that the phase retardation axes of the first quarter-wave film and the second quarter-wave film form 45° or 135° with the absorption axis of the lower polarizer or the upper polarizer. When the angle formed by the phase retardation axes of the first quarter-wave film and the second quarter-wave film with the absorption axis of the lower polarizer or the upper polarizer is 45° or 135°, it is possible to test a wide range of plane directional phase differences of the first quarter-wave film and the second quarter-wave film through the color of the light detected in the color detecting part.

It can be determined that the plane directional phase differences of the first quarter-wave film and the second quarter-wave film are a wavelength corresponding to ¼ times the wavelength of light excluded from the wavelength of the light detected in the color detecting part. For example, when the wavelength of light excluded from the wavelength of the light detected in the color detecting part is 360 nm, the plane directional phase differences of the first quarter-wave film and the second quarter-wave film may be 90 nm; when the wavelength of light excluded from the wavelength of the light detected in the color detecting part is 500 nm, the plane directional phase differences of the first quarter-wave film and the second quarter-wave film may be 125 nm; and when the wavelength of light excluded from the wavelength of the light detected in the color detecting part is 800 nm, the plane directional phase differences of the first quarter-wave film and the second quarter-wave film may be 200 nm.

Furthermore, if the principle of the device for testing optical properties of the present application is utilized in a polarizing plate for display in which the upper polarizer is disposed on the second quarter-wave film having a plane directional phase difference or phase retardation axis of a known value, in an attached state, the optical properties of the second quarter-wave film can be tested. In the optical properties of the second quarter-wave film, using the device for testing optical properties of the present application, the above-described contents may be equally applied in the case of being intended to test the phase retardation axis of the second quarter-wave film or in the case of being intended to test the plane directional phase differences of the first quarter-wave film and the second quarter-wave film.

The present application also relates to a method for testing optical properties. The method for testing optical properties relates to, for example, a method for testing optical properties through the above-described device for testing optical properties. Therefore, in the details of the method for testing optical properties to be described below, the contents described in the device for testing optical properties can be applied equally. The method for testing optical properties through the device for testing may be a method in which a wide range of plane directional phase differences can be tested, and an efficiency of testing the phase retardation axis is improved.

An exemplary method for testing optical properties may comprise a transmitting step and a testing step.

The transmitting step may be a step of sequentially forming a light source that emits un-polarized light, a lower polarizer, a first quarter-wave film, a second quarter-wave film, an upper polarizer and a color detecting part, and emitting un-polarized light from the light source to the lower polarizer side to transmit the upper polarizer.

The detailed description of the light source, the lower polarizer, the first quarter-wave film, the second quarter-wave film, the upper polarizer and the color detecting part is as described in the device for testing optical properties, and thus it is omitted.

The lower polarizer and the upper polarizer may be disposed such that their absorption axes are parallel to each other. For example, when the lower polarizer has an absorption axis in one direction (shown as ↔), the upper polarizer may also have an absorption axis in one direction (shown as ↔), and the lower polarizer and the upper polarizer may have transmission axes in a direction (shown as ↕) orthogonal to the absorption axes. By having the absorption axes of the lower polarizer and the upper polarizer parallel, the un-polarized light emitted from the light source can be aligned as the light that can transmit the upper polarizer through the lower polarizer.

The testing step may be a step of detecting the color of light transmitting the upper polarizer in the color detecting part and testing the optical property of the quarter-wave film.

In one example, in the testing step, when the optical property to be tested is a phase retardation axis of the second quarter-wave film, it may comprise a fixing step and a determining step.

In the fixing step, the second quarter-wave film may have a plane directional phase difference known as the same value as that of the first quarter-wave film. For example, the plane directional phase differences of the first quarter-wave film and the second quarter-wave film may be 90 nm to 200 nm. The detailed description of the plane directional phase differences of the first quarter-wave film and the second quarter-wave film is as described in the device for testing optical properties, and thus it is omitted.

Furthermore, in the fixing step, the phase retardation axis of the first quarter-wave film having a plane directional phase difference known as the same value as that of the second quarter-wave film and the absorption axis of the lower polarizer may be fixed so as to form 45° or 135°. By being subjected to dispose the first quarter-wave film in an attached state on the lower polarizer, the first quarter-wave film can have a fixed phase retardation axis, whereby in the determining step, it can be determined that the phase retardation axis of the second quarter-wave film is parallel to the phase retardation axis of the first quarter-wave film.

The determining step may be a step of rotating the second quarter-wave film horizontally and determining that when the color of the light excluding the wavelength of the light corresponding to four times the plane directional phase difference of the second quarter-wave film is detected in the color detecting part, the phase retardation axis of the second quarter-wave film is parallel to the phase retardation axis of the first quarter-wave film. For example, when the color detected in the color detecting part is yellow in the case that the second quarter-wave film has a plane directional phase difference of 90 nm, it can be determined that the phase retardation axis of the second quarter-wave film is parallel to the phase retardation axis of the first quarter-wave film; when the color detected in the color detecting part is magenta in the case that the second quarter-wave film has a plane directional phase difference of 125 nm, it can be determined that the phase retardation axis of the second quarter-wave film is parallel to the phase retardation axis of the first quarter-wave film; and when the color detected in the color detecting part is cyan in the case that the second quarter-wave film has a plane directional phase difference of 200 nm, it can be determined that the phase retardation axis of the second quarter-wave film is parallel to the phase retardation axis of the first quarter-wave film.

In another example, in the testing step, when the optical property to be tested is plane directional phase differences of the first quarter-wave film and the second quarter-wave film, it may comprise a disposing step and a determining step.

The disposing step may be a step of fixing the phase retardation axes of the first quarter-wave film and the second quarter-wave film to be parallel to each other, wherein the first quarter-wave film and the second quarter-wave film each have a phase retardation axis of a known value, and disposing the phase retardation axes to form 45° or 135° with the absorption axis of the lower polarizer or the upper polarizer. For example, in a state where the phase retardation axes of the first quarter-wave film and the second quarter-wave film are fixed to be parallel to each other, the plane directional phase differences of the first quarter-wave film and the second quarter-wave film can be tested by disposing the phase retardation axes of the first quarter-wave film and the second quarter-wave film to form 45° or 135° with the absorption axis of the lower polarizer and the upper polarizer.

When the angle formed by the phase retardation axes of the first quarter-wave film and the second quarter-wave film with the absorption axis of the lower polarizer or the upper polarizer is 45° or 135°, the plane directional phase differences of the first quarter-wave film and the second quarter-wave film can be determined in the determining step through the color of light detected in the color detecting part.

The determining step may be a step of determining a wavelength corresponding to ¼ times the wavelength of light excluded from the wavelength of the light detected in the color detecting part as plane directional phase differences of the first quarter-wave film and the second quarter-wave film. For example, when the wavelength of light excluded from the wavelength of the light detected in the color detecting part is 360 nm, it can be determined that the plane directional phase differences of the first quarter-wave film and the second quarter-wave film are 90 nm; when the wavelength of light excluded from the wavelength of the light detected in the color detecting part is 500 nm, it can be determined that the plane directional phase differences of the first quarter-wave film and the second quarter-wave film are 125 nm; and when the wavelength of light excluded from the wavelength of the light detected in the color detecting part is 800 nm, it can be determined that the plane directional phase differences of the first quarter-wave film and the second quarter-wave film are 200 nm.

Effects of Invention

The present invention can provide a device for testing optical properties with inexpensive device manufacturing and maintenance costs, and a method for testing optical properties with improved identification efficiency of the phase retardation axis, which is capable of testing a wide range of plane directional phase differences through the device for testing optical properties.

BRIEF DESCRIPTION OF DRAWINGS

FIGS. 1 and 2 are views showing exemplary device for testing optical properties.

MODE FOR INVENTION

Hereinafter, the present application will be described in more detail by way of examples according to the present application and comparative examples not complying with the present application, but the scope of the present application is not limited by the following examples.

EXAMPLES

Manufacture of Device for Testing Optical Properties

A light source (W lamp, shimadzu) emitting non-polarized light, a lower polarizer (PVA, Kuraray) having an absorption axis in one direction (shown as a first quarter-wave film (cycloolefin polymer (COP), Zeon), a second quarter-wave film (triacetylcellulose (TAC), Fuji) coated with liquid crystals (MUSK), an upper polarizer (PVA, Kuraray) in which an absorption axis is parallel to the lower polarizer and a color detecting part (Detector CA 210, Konica Minolta) were disposed sequentially to manufacture a device for testing optical properties.

Phase Retardation Axis Test

Samples 1, 2 and 3, in which plane directional phase differences and phase retardation axes were known, were prepared as the first quarter-wave film. The plane directional phase differences of Samples 1, 2, and 3 were 90 nm, 125 nm, or 200 nm, respectively, and the phase retardation axes of Samples 1, 2, and 3 were disposed to form 45° with the absorption axis of the lower polarizer.

Samples 4, 5 and 6, in which only the plane directional phase difference values were known and phase retardation axes were unknown, were prepared as the second quarter-wave film. The plane direction phase differences of Samples 4, 5 and 6 are 90 nm, 125 nm or 200 nm, respectively.

Subsequently, Sample 1 was disposed on the lower polarizer and fixed, and then Sample 4 was disposed between Sample 1 and the upper polarizer in an unattached state. Next, while rotating Sample 4 at a speed of 0.1 m/s, un-polarized light was emitted from the light source to sequentially transmit the lower polarizer, Sample 1, Sample 4 and the upper polarizer. When the color of the light detected in the color detecting part was detected as the color except for the wavelength of light corresponding to four times the plane directional phase differences of Sample 1 and Sample 4, it was determined that the phase retardation axis of Sample 4 is parallel to the phase retardation axis of Sample 1.

The phase retardation axis of Sample 4 was evaluated by testing the angle formed by the phase retardation axis of Sample 4 with the lower polarizer or the upper polarizer, and the results were shown in Table 1 below.

The phase retardation axis test was performed using Samples 2 and 5 instead of Samples 1 and 4 and the phase retardation axis test was also performed using Samples 3 and 6 instead of Samples 1 and 4, and the results were shown in Table 1 below.

TABLE 1

|  | Sample 1 | Sample 2 | Sample 3 |
| --- | --- | --- | --- |
| Plane directional phase difference of the first quarter-wave film (nm) | 90 | 125 | 200 |
| Angle formed by the absorption axis of the lower polarizer or the upper polarizer with the phase retardation axis of the first quarter-wave film (°) |  | 45 |  |

|  | Sample 4 | Sample 5 | Sample 6 |
| --- | --- | --- | --- |
| Plane directional phase difference of the second quarter-wave film (nm) | 90 | 125 | 200 |
| Color detected in the color detecting part | yellow | magenta | Cyan |
| Angle formed by the absorption axis of the lower polarizer or the upper polarizer with the phase retardation axis of the second quarter-wave film (°) |  | 45 |  |

As shown in Table 1, by confirming that when a color excluding the wavelength region of light corresponding to four times the plane directional phase difference of the first quarter-wave film or the second quarter-wave film is detected in the color detecting part, the phase retardation axes of the first quarter-wave film and the second quarter-wave film are parallel and the angle formed by the absorption axis of the lower polarizer or the upper polarizer with the phase retardation axis of the second quarter-wave film is 45°, the phase retardation axis of the second quarter-wave film can be easily tested at low cost without precise test as well.

Plane Directional Phase Difference Test

Samples 7, 8 and 9, in which plane directional phase differences were unknown and only the phase retardation axes were known, were prepared as the first quarter-wave film. Samples 10, 11 and 12, which were the same as Samples 7, 8 and 9, were prepared as the second quarter-wave film. The phase retardation axes of Samples 7, 8, 9, 10, 11 and 12 were disposed to form 45° with the absorption axis of the lower polarizer. Although the plane directional phase differences of the first quarter-wave film and the second quarter-wave film have been unknown, Sample 7 and Sample 10 have the same plane directional phase difference value, Sample 8 and Sample 11 have the same plane directional phase difference value, and Sample 9 and Sample 12 have the same plane directional phase difference value.

Next, in a state where the phase retardation axes of Sample 7 and Sample 10 were fixed to be parallel to each other, Sample 7 and Sample 10 were disposed between the lower polarizer and the upper polarizer in an unattached state, and un-polarized light was emitted from the light source to transmit the lower polarizer, Sample 7, Sample 10 and the upper polarizer sequentially. The wavelength corresponding to ¼ times the wavelength of the light excluded from the wavelength of the light detected in the color detecting part was determined as the plane direction phase difference of Sample 7 or Sample 10, evaluated and the results were shown in Table 2 below.

The plane directional phase difference test was performed using Samples 8 and 11 instead of Samples 7 and 10 and the plane directional phase difference test was also performed using Samples 9 and 12 instead of Samples 7 and 10, and the results were shown in Table 2 below.

TABLE 2

|  | Sample 7 | Sample 8 | Sample 9 |
|---|---|---|---|
| Angle formed by the phase retardation axis of the first quarter-wave film with the absorption axis of the lower polarizer (°) | 45 | | |

|  | Sample 10 | Sample 11 | Sample 12 |
|---|---|---|---|
| Angle formed by the phase retardation axis of the second quarter-wave film with the absorption axis of the lower polarizer (°) | 45 | | |
| Color detected in the color detecting part | yellow | magenta | Cyan |
| Plane directional phase difference of the first quarter-wave film or the second quarter-wave film (nm) | 90 | 125 | 200 |

As shown in Table 2, it can be confirmed that when the phase retardation axis of the first quarter-wave film or the second quarter-wave film forms 45° with the absorption axis of the lower polarizer or the upper polarizer, in the case that the color detected in the color detecting part is yellow, the plane directional phase difference of the first quarter-wave film or the second quarter-wave film is 90 nm; in the case that the color detected in the color detecting part is magenta, the plane directional phase difference of the first quarter-wave film or the second quarter-wave film is 125 nm; and in the case that the color detected in the color detecting part is cyan, the plane directional phase difference of the first quarter-wave film or the second quarter-wave film is 200 nm, and thus it is possible to test a wide range of plane directional phase differences of the first quarter-wave film or the second quarter-wave film through the device for testing optical properties.

COMPARATIVE EXAMPLES

Manufacture of Device for Testing Optical Properties

A second quarter-wave film (triacetylcellulose (TAC), Fuji) was disposed in an equipment (Axoscan, Axometrics) composed of a polarized light source generating part continuously generating a polarized light source from right circularly polarized light to left circularly polarized light and a testing part to manufacture a device for testing optical properties.

Phase Retardation Axis Test and Plane Directional Phase Difference Test

Samples 13, 14 and 15, in which the plane directional phase differences and phase retardation axes were unknown, were prepared as the second quarter-wave film.

Next, Sample 13 was disposed between the polarized light source generating part and the testing part so that the direction in which the polarized light source passed and the plane direction of Sample 13 were perpendicular to each other, and then the polarized light source emitted from the polarized light source generating part passed through Sample 13, which was intended to test the phase retardation axis and the plane directional phase difference, and was continuously emitted from the testing part, where it was tested how much the phases of the continuously emitted polarized light sources were retarded with respect to the axis of a certain direction, and the results were shown in Table 3 below.

The phase retardation axis test and the plane directional phase difference test were performed using Sample 14 instead of Sample 13 and the phase retardation axis test and the plane directional phase difference test were also performed using Sample 15 instead of Sample 13, and the results were shown in Table 3 below.

TABLE 3

|  | Sample 13 | Sample 14 | Sample 15 |
|---|---|---|---|
| Angle formed by the phase retardation axis of the second quarter-wave film with the direction in which the polarized light source generated from the polarized light source generating part passes (°) | 45 | 45 | 135 |
| Plane directional phase difference of the second quarter-wave film (nm) | 125 | 125 | 127 |

As shown in Table 3, by measuring the phase retardation axes and the plane directional phase differences of the second quarter-wave film using the equipment composed of the polarizing light source generating part continuously generating the polarized light source from the right circularly polarized light to the left circularly polarized light, and the testing part, the expensive device manufacturing and maintenance costs have been consumed.

Also, in the case of using the device for testing optical properties of the above comparative example, it may be troublesome to perform calibration by using a standard sample (a sample in which an optical axis is fixed between two sheets of glass) to know an optical axis at a specific wavelength in advance, and in the absence of the standard sample, there may be a problem that the optical property of the second quarter-wave film cannot be measured.

EXPLANATION OF REFERENCE NUMERALS

101: lower polarizer
102: upper polarizer
103: first quarter-wave film
104: second quarter-wave film
105: light source
106: color detecting part
R: red
G: green
B: blue
C: cyan
M: magenta
Y: yellow

The invention claimed is:

1. A device for testing optical properties of a quarter-wave film comprising a light source that emits non-polarized light, a lower polarizer, a first quarter-wave film, a second quarter-wave film, an upper polarizer and a color detecting part in sequence;
wherein, the optical property to be tested is a phase retardation axis of the second quarter-wave film, the method comprises:
a step of fixing a phase retardation axis of said first quarter-wave film and an absorption axis of the lower polarizer so as to form an angle of 45 degree or 135 degree, wherein said second quarter-wave film has a plane directional phase difference known as the same value as that of said first quarter-wave film; and
a step of rotating said second quarter-wave film horizontally and determining that when the color of the light excluding wavelength of light corresponding to four times the plane directional phase difference of said second quarter-wave film is detected in said color detecting part, the phase retardation axis of said second quarter-wave film is parallel to the phase retardation axis of said first quarter-wave film.

2. The device according to claim 1, wherein said light source emits said un-polarized light to said lower polarizer side.

3. The device according to claim 1, wherein said lower polarizer and upper polarizer are disposed so that their absorption axes are parallel to each other.

4. The device according to claim 1, wherein said first quarter-wave film or second quarter-wave film has a plane directional phase difference of 90 nm to 200 nm.

5. The device according to claim 1, wherein said first quarter-wave film or second quarter-wave film has the same plane directional phase difference to each other.

6. The device according to claim 1, wherein color of a light transmitting said upper polarizer is detected by said color detecting part to test the optical property of the quarter-wave film.

7. The device according to claim 6, wherein the device evaluates the optical property when the color of the light excluding wavelength of light corresponding to four times a plane directional phase difference of said first quarter-wave film or second quarter-wave film is detected by said color detecting part.

8. The device according to claim 1, wherein the optical property to be tested through said device is a phase retardation axis of the second quarter-wave film having a plane directional phase difference of a known value.

9. The device according to claim 8, wherein the phase retardation axis of said second quarter-wave film is tested by horizontally rotating said second quarter-wave film in a state fixed such that an absorption axis of the lower polarizer and a phase retardation axis of the first quarter-wave film form an angle of 45° or 135°.

10. The device according to claim 9, wherein when color of a light excluding wavelength of light corresponding to four times the plane directional phase difference of said second quarter-wave film is detected in said color detecting part, it is determined that the phase retardation axis of said second quarter-wave film is parallel to the phase retardation axis of the first quarter-wave film.

11. The device according to claim 1, wherein a plane directional phase difference and a phase retardation axis of said first quarter-wave film have known values.

12. The device according to claim 1, wherein the optical property to be tested through said device is plane directional phase differences of the first quarter-wave film and the second quarter-wave film each having a phase retardation axis of a known value.

13. The device according to claim 12, wherein said plane directional phase difference is tested in a state disposed such that the phase retardation axes of said first quarter-wave film and said second quarter-wave film are fixed parallel to each other and said phase retardation axes form an angle of 45° or 135° with an absorption axis of the lower polarizer or the upper polarizer.

14. The device according to claim 13, wherein a wavelength value corresponding to ¼ times the wavelength of light excluded from the wavelength of light detected in said color detecting part is determined as plane directional phase differences of the first quarter-wave film and the second quarter-wave film.

15. A method for testing optical properties comprising: a step of sequentially
forming a light source that emits un-polarized light, a lower polarizer, a first quarter-wave film, a second quarter-wave film, an upper polarizer and a color detecting part, and emitting un-polarized light from said light source to said lower polarizer side to transmit said upper polarizer; and a step of detecting color of light transmitting said upper polarizer in the color detecting part and testing the optical properties of the quarter-wave film;
wherein, the optical property to be tested is a phase retardation axis of the second quarter-wave film, the method comprises:
a step of fixing a phase retardation axis of said first quarter-wave film and an absorption axis of the lower polarizer so as to form an angle of 45 degree or 135 degree, wherein said second quarter-wave film has a plane directional phase difference known as the same value as that of said first quarter-wave film; and
a step of rotating said second quarter-wave film horizontally and determining that when the color of the light excluding wavelength of light corresponding to four times the plane directional phase difference of said second quarter-wave film is detected in said color detecting part, the phase retardation axis of said second quarter-wave film is parallel to the phase retardation axis of said first quarter-wave film.

16. The method for testing according to claim 15, wherein the optical property to be tested is plane directional phase differences of the first quarter-wave film and the second quarter-wave film, the method comprises:
a step of fixing phase retardation axes of said first quarter-wave film and said second quarter-wave film to be parallel to each other, wherein said first quarter-wave film and said second quarter-wave film each has a phase retardation axis of a known value, and disposing said phase retardation axes so as to form an angle of 45° or 135° with an absorption axis of the lower polarizer or the upper polarizer; and a step of determining a wavelength value corresponding to ¼ times wavelength of light excluded from a light detected in said color detecting part as plane directional phase differences of the first quarter-wave film and the second quarter-wave film.

\* \* \* \* \*